United States Patent
Detering et al.

(10) Patent No.: US 9,166,820 B2
(45) Date of Patent: Oct. 20, 2015

(54) METHOD AND APPARATUS FOR PROVIDING AN ENHANCED TEXT MESSAGING SERVICE

(75) Inventors: Christopher C. Detering, Ann Arbor, MI (US); Dale Rathbun, II, Monroe, MI (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 721 days.

(21) Appl. No.: 12/639,311

(22) Filed: Dec. 16, 2009

(65) Prior Publication Data

US 2011/0142210 A1    Jun. 16, 2011

(51) Int. Cl.
G06F 15/16 (2006.01)
H04L 12/58 (2006.01)
H04W 4/12 (2009.01)
H04W 4/16 (2009.01)
H04W 8/18 (2009.01)

(52) U.S. Cl.
CPC ............ *H04L 12/581* (2013.01); *H04L 12/589* (2013.01); *H04L 51/04* (2013.01); *H04L 51/36* (2013.01); *H04W 4/12* (2013.01); *H04W 4/16* (2013.01); *H04W 8/18* (2013.01)

(58) Field of Classification Search
CPC ....... H04L 51/36; H04L 51/04; H04L 12/589; H04L 12/581
USPC .......................................................... 709/206
See application file for complete search history.

(56) References Cited

U.S. PATENT DOCUMENTS

| | | | |
|---|---|---|---|
| 6,442,589 B1* | 8/2002 | Takahashi et al. | 709/203 |
| 7,392,306 B1* | 6/2008 | Donner et al. | 709/224 |
| 2001/0047294 A1* | 11/2001 | Rothschild | 705/14 |
| 2007/0101009 A1* | 5/2007 | Chen et al. | 709/229 |
| 2007/0283039 A1* | 12/2007 | Kim et al. | 709/238 |
| 2009/0198777 A1* | 8/2009 | LaFreniere et al. | 709/206 |

* cited by examiner

Primary Examiner — Maceeh Anwari

(57) ABSTRACT

A method and apparatus for providing a text messaging service are disclosed. For example, the method receives a text message destined to a customer, and determines a preference of the customer for forwarding the text message, wherein the preference comprises a plurality of customer endpoint devices for receiving the text message. The method forwards the text message in accordance with a sender input, if the preference of the customer allows for processing of the text message in accordance with the sender input, and forwards the text message in accordance with the preference of the customer; if the preference of the customer does not allow sender input.

14 Claims, 4 Drawing Sheets

METHOD AND APPARATUS FOR PROVIDING AN ENHANCED TEXT MESSAGING SERVICE

The present disclosure relates generally to communication networks and, more particularly, to a method and apparatus for enabling access to an enhanced text messaging service over a network, e.g., a wireless network or a wire-based network.

BACKGROUND

Today's communication networks enable users to communicate using a variety of media. For example, users may exchange voice and data packets using a cell phone, a landline phone, and so on. The communication among various users and the type of communication among various users may change over time. For example, the need for mobility has helped services developed for mobile networks, e.g., services developed for cellular networks, gain popularity. For example, text messaging services are popular among subscribers of a cellular network service. In addition, most users still have their land lines and entertainment networks. For example, a user may subscribe to a landline based IP phone service, to a cellular network based service, and a broadcast cable network based service. Thus, a user may have multiple customer endpoint devices with each being used for a specific service. Despite having subscriptions to services from various networks, a text message sent to a mobile phone can only be accessed the user's mobile phone.

SUMMARY

In one embodiment, the present disclosure discloses a method and apparatus for providing a text messaging service. For example, the method receives a text message destined to a customer, and determines a preference of the customer for forwarding the text message, wherein the preference comprises a plurality of customer endpoint devices for receiving the text message. The method forwards the text message in accordance with a sender input, if the preference of the customer allows for processing of the text message in accordance with the sender input, and forwards the text message in accordance with the preference of the customer; if the preference of the customer does not allow sender input.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method and apparatus for providing an enhanced text messaging service to a customer. The present disclosure can be applied on wireless and wire-based networks that are capable of supporting one or more customer endpoint devices that comprise one or more of: a cell phone, a wireless phone, a smart phone, an Internet Protocol (IP) phone, a television, and/or a set-top box for a television. It is should be noted that the above list of customer endpoint devices is only illustrative and not exhaustive. As such, other customer endpoint devices that can be adapted to operate with the present method are within the scope of the present disclosure.

Figure 1:
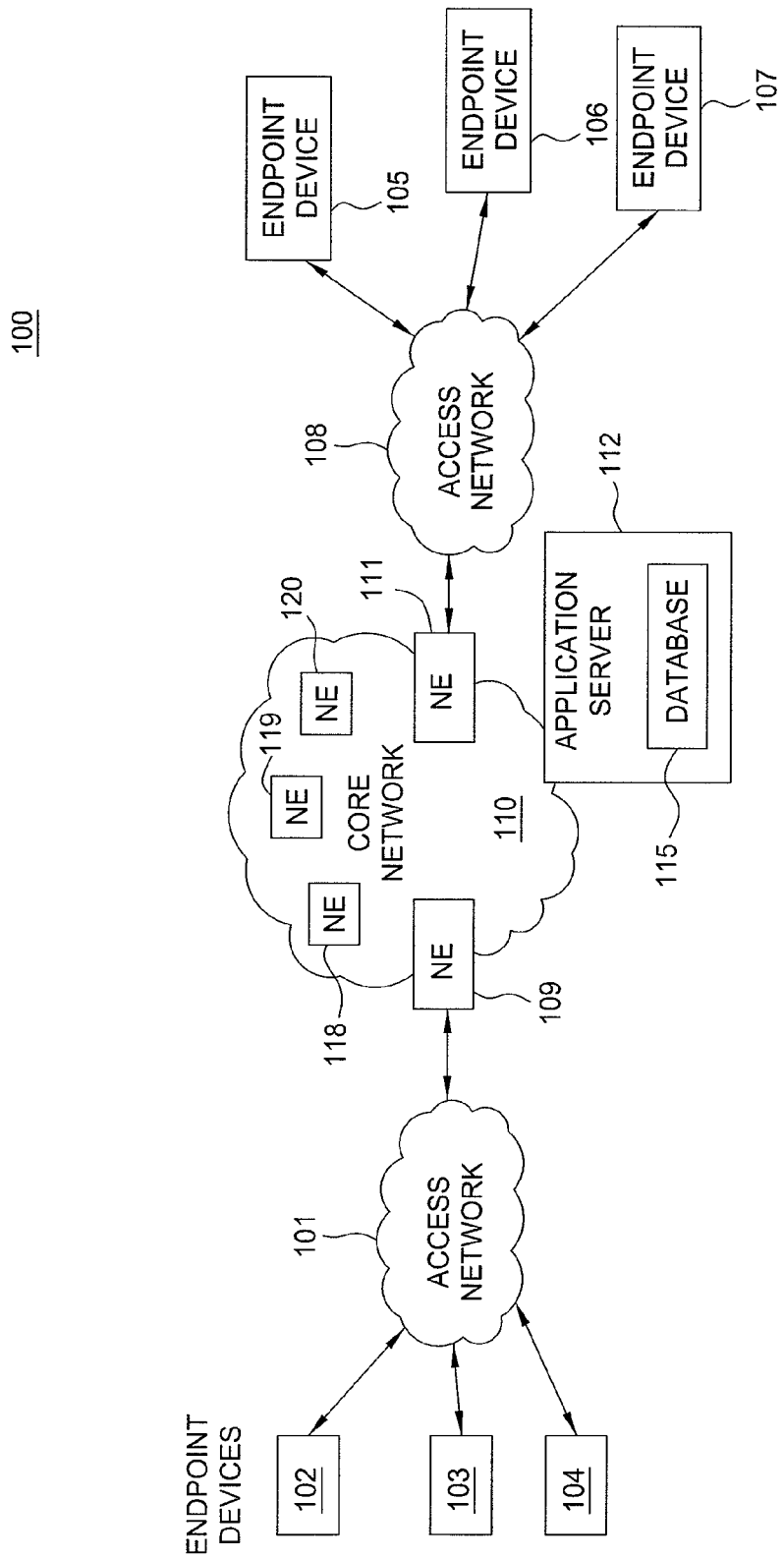
FIG. 1 illustrates an exemplary network for accessing a network service related to the present disclosure.

FIG. 1 illustrates an exemplary network 100 for accessing a network service related to the present disclosure. Exemplary networks include packet networks, Internet protocol (IP) networks, Public Switched Telephone Networks (PSTN), wireless networks, cellular networks, various access networks, and the like. The present disclosure is not limited to a particular type of network.

In one embodiment, the network may comprise a plurality of endpoint devices 102-104 configured for communication with the core network 110 (e.g., an IP based core backbone network such as Internet Protocol (IP) Multimedia Subsystem (IMS) network and the like, supported by a service provider) via an access network 101. Similarly, a plurality of endpoint devices 105-107 are configured for communication with the core network 110 via an access network 108. The network elements 109 and 111 may serve as gateway devices, e.g. servers or edge routers for the core network 110.

The endpoint devices 102-107 may comprise customer endpoint devices such as wire-based phones, wireless phones, cellular phones, smart phones, set-top boxes, televisions, and the like.

The access networks 101 and 108 serve as a conduit to establish a connection between the endpoint devices 102-107 and the NEs 109 and 111 of the core network 110. The access networks 101 and 108 may each comprise a Digital Subscriber Line (DSL) network, a broadband cable access network, a Local Area Network (LAN), a wireless local area network (WLAN), a Wireless Access Network (WAN), a cellular network, a $3^{rd}$ party network, and the like. The access networks 101 and 108 may be either directly connected to NEs 109 and 111 of the core network 110, or indirectly through another network.

A wireless access network, e.g., access network 101 or 108, may support a wireless service, e.g., Wi-Fi (Wireless Fidelity), WiMAX (Worldwide Interoperability for Microwave Access), 2G, 3G, or LTE (Long Term Evolution) or other 4G wireless services, and the like. Broadly defined, Wi-Fi is a wireless local area network (WLAN) technology based on the Institute of Electrical & Electronics Engineers (IEEE) 802.11 standards. WiMAX is a wireless metropolitan area network (MAN) technology based on the Institute of Electrical & Electronics Engineers (IEEE) 802.16 standards. 2G is a second generation cellular network technology, 3G is a third generation cellular network technology, and 4G is a fourth generation cellular network technology. Global System for Mobile (GSM) communications is an example of a 2G cellular technology, Universal Mobile Telecommunications System (UMTS) is an example of a 3G cellular network technology, and an LTE is an example of a 4G cellular network technology. It should be noted that the present disclosure is not limited to a particular type of wireless service.

Some NEs (e.g., NEs 109 and 111) reside at the edge of the core infrastructure and interface with customer endpoints over various types of access networks. An NE that resides at the edge of a core infrastructure is typically implemented as an edge router, a media gateway, a border element, a firewall, a switch, and the like. An NE may also reside within the network (e.g., NEs 118-120) and may be used as a mail server, a router, or like device.

The core network 110 also comprises an application server 112 that contains a database 115. The application server 112 may comprise any server or computer that is well known in the art, and the database 115 may be any type of electronic collection of data that is also well known in the art. In one embodiment, the application server 112 may implement an enhanced text messaging service as further described below. It should be noted that although only six endpoint devices, two access networks, five network elements, and one application server are depicted in FIG. 1, the communication network 100 may be expanded by including additional endpoint devices, access networks, network elements, and application servers without altering the scope of the present disclosure.

The above communication network is described to provide an illustrative environment in which packets for various services are transmitted on networks. In one embodiment, a service provider may wish to provide text messaging service to customers (broadly users) via a variety of customer endpoint devices, e.g., wherein the customer endpoint devices comprise one or more of: a cellular phone, a wireless telephone, a television, a set-top box in junction with a display device (e.g., a television or video monitor), and an IP-phone.

For example, a customer may subscribe to an enhanced text messaging service from a network service provider. The enhanced text messaging service may be accessed via a wire-based network, a broadcast cable network or the wireless cellular network. Hence, a customer may access a text message, e.g., a short message service (SMS) message, via a set-top box, an IP phone or a cell phone. Broadly, a text message in this disclosure is a mobile text message that is provided via a mobile messaging service, e.g., the text message is sent directly from a mobile phone (broadly comprising a cellular phone, a smart phone and the like) via a messaging service. Thus, a mobile text message is not an email message.

In one embodiment, the service provider may receive a text message directed towards the customer, e.g., directed to a cellular phone of the customer. For example, an application server may be implemented in the service provider network for implementing an enhanced text messaging service. The application server may receive a text message directed towards the customer. In one embodiment, the service provider may forward (push) received text messages towards one or more customer endpoint devices, e.g., wherein the one or more customer endpoint devices comprise one or more of: a set-top box, an IP phone and a cell phone.

In one embodiment, the customers of the enhanced text messaging service may provide profiles and preferences via a web portal or a smart phone (e.g., a cell phone with Internet access). For example, the profile of the customer may indicate a plurality of customer endpoint devices that are available to receive the text message, and the address (e.g., IP address, phone number, and the like) of each of the customer endpoint devices that may receive text messages for the customer. The preference of the customer may indicate to which of the one or more customer endpoint devices the customer wishes to have text messages forwarded. For example, a customer may prefer to receive text messages only via the cell phone. In another example, a customer may prefer to receive text messages on the cell phone and set-top box. In yet another example, the customer may prefer to receive the text messages on the cell phone, the set-top box and the IP phone, and so on. That is, the customer, as the recipient of the text messages, provides one or more preferences that indicate to which of the one or more customer endpoint devices the received text messages should be sent.

Furthermore, in one embodiment, not only is the customer allowed to specify which customer endpoint devices will receive the text messages, the customer may specify an order in the which the text message can be received by the customer endpoint devices. For example, the customer may specify that a text message destined to a cellular phone should only be initially sent to the cellular phone. However, if the user does not address the received text message (e.g., reading the text message and/or replying to the received text message) via the cellular phone, the text message is then forwarded to other customer endpoint devices (including in what order) as specified by the preference of the customer.

In one embodiment, the preference of the customer may depend on time of day. For example, a customer may indicate receiving text messages via the cell phone during working hours and via the set-top box during non-working hours and so on.

In one embodiment, the preference of the customer may depend on the identity of the sender. For example, the customer may indicate receiving text messages from family members on all customer endpoint devices, while specifying the receipt of text messages from co-workers limited only to the cell phone.

In one embodiment, the preference of the customer may depend on a priority level of a received text message. For example, the application server may determine whether the received text message is indicated as a high priority message or a low priority message (or any other gradations of priority). In one embodiment, the service provider may enable a plurality of priority levels for text messages, wherein the number of priority levels is determined either by the customer and/or the service provider. For example, a customer with premium text messaging service may be provided a large number of priority levels (e.g., ten levels), while a customer of a basic text messaging service may be provided a small number (e.g., two levels) of priority levels, or even no priority level option.

In one embodiment, the application server may request an input from the sender regarding a priority level of the text message. For example, the sender may indicate that the text message is a low priority text message and that forwarding to the recipient via the cell phone is adequate. In another example, the sender may indicate that the text message is a high priority text message and it should be forwarded to the recipient via all possible customer endpoint devices such that the customer is more likely to receive the text message in a timely manner.

In one embodiment, the preference of the customer may allow the sender of the text message to have an input in selecting the type of one or more customer endpoint devices to which the text message is to be sent. For example, the sender may indicate for the text message to be sent only to a set-top box. For example, a sender of a text message may know for a fact that the customer (the recipient) is currently watching a sports program. When the sender sends the text message, he can specify that the text message be sent to the set-top box of the recipient.

In one example, the customer may be at a location away from the customer's own IP phone and set-top box. For example, a customer may be away from home and may also not be carrying the customer's cell phone. In one embodiment, the current method enables the customer to receive the text message at another customer's location. For example, the customer may access the enhanced text messaging service via a web portal and change his/her preference such that the preference of the customer enables the customer to receive text messages at a different location. For example, the customer may be visiting someone and may realize he/she neglected to bring the cell phone. The customer may then provide new preferences such that text messages are received at a new location, e.g., via another customer's set-top box.

In one embodiment, the service provider enables a customer to receive a message waiting indication, wherein the message waiting indication indicates that the customer has a text message waiting to be received. For example, a customer may be at another location and may receive a message waiting indication via another customer's set-top box. For example, a message waiting indication may scroll on another customer's television screen, wherein the television receives the indication via the other customer's set-top box. The customer may then elect to retrieve the text message, call back the sender of the text message, and so on. In other words, the text message itself is not immediately displayed, but only an indicator (e.g., an icon or a short message) is displayed indicating the receipt of the text message. This will allow a measure of privacy to ensure that the customer is ready to receive and view the text message, especially when the customer is at a different location as discussed in the above example.

In one embodiment, the message waiting indication may include the sender's identity, phone number, etc. For example, the indication may be "A text message from John Doe at phone number nnn-xxx-yyyy is waiting for you", wherein John Doe indicates the name and nnn-xxx-yyyy indicates the phone number of the sender of the text message. In another example, the message waiting indication may simply indicate a message is waiting without providing details regarding the sender.

Figure 2:
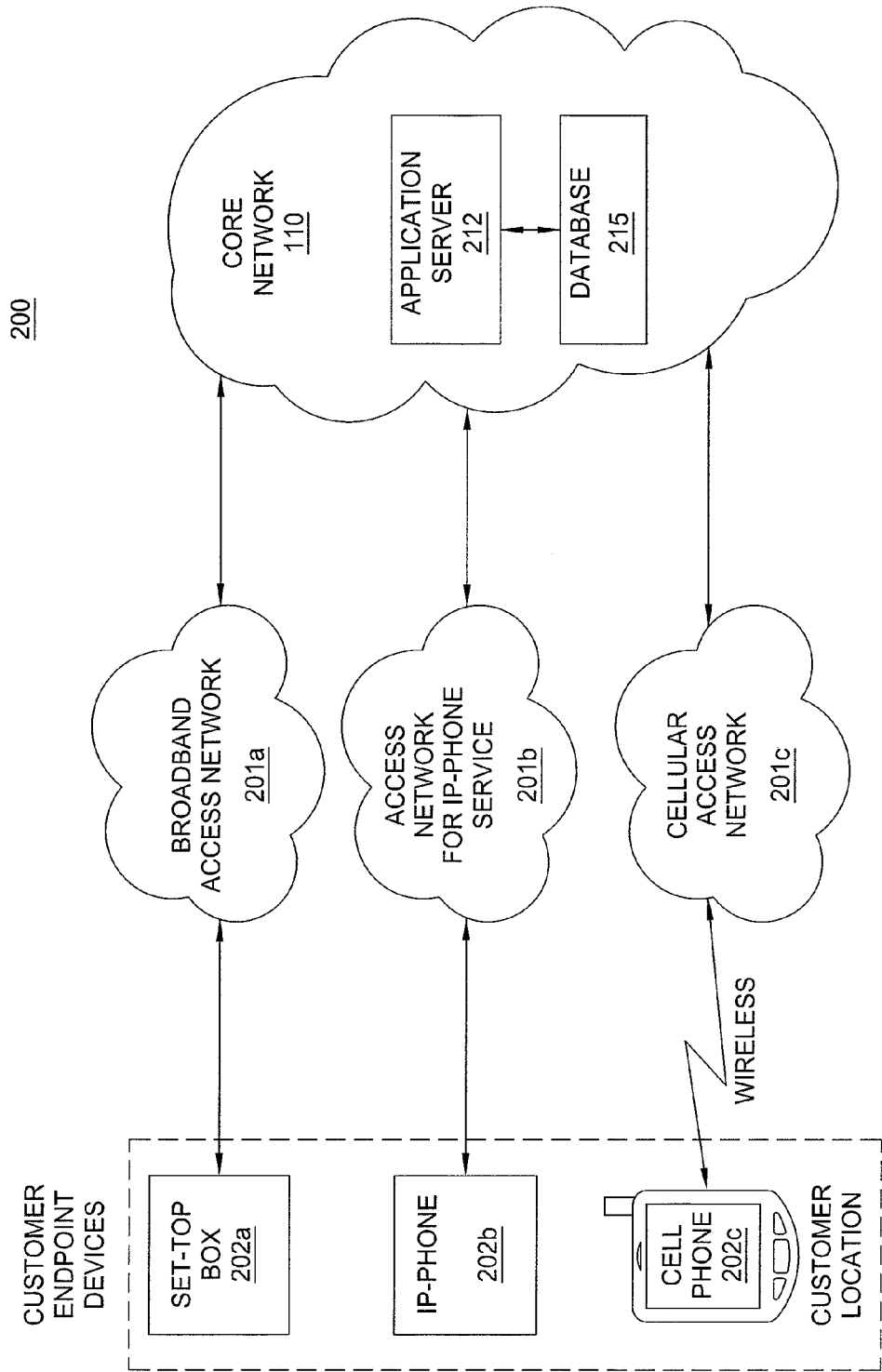
FIG. 2 illustrates an exemplary network for providing an enhanced text messaging service.

FIG. 2 illustrates an exemplary network 200 for providing an enhanced text messaging service. The network shows an illustrative architecture that supports a customer accessing an enhanced text messaging service from the core network 110 via a customer endpoint device 202a, 202b or 202c. For example, the customer endpoint devices 202a, 202b and 202c are a set-top box, an IP phone and a cell phone, respectively. Again, the listing of the customer endpoint devices is only illustrative in this example. Unlike the standard text messaging service that allows text messages to be received only on a cell phone, in one embodiment an enhanced text messaging service enables the customer to receive the text message via a cell phone, an IP phone and/or a set-top box. For example, the set-top box 202a communicates with the core network 110 via a broadband access network 201a. The IP phone 202b communicates with the core network 110 via the access network for the IP phone service 201b (e.g., a cable access network, a wireless access network, a broadband access network and the like). The cell phone 202c communicates with the core network 110 via the cellular access network 201c.

In one embodiment, the core network 110 also comprises an application server 212 and a database 215. For example, the network service provider implements the method for providing an enhanced text messaging service in the application server 212. The network service provider enables a customer to subscribe to a text messaging service, and to provide customer profiles and preferences. In turn, the application server 212 stores the customer profiles, preferences, etc. (broadly customer profile) in the database 215.

In operation, when a text message for a subscriber of a text messaging service is received, the application server 212 consults the recipient's profiles and preferences. The application server determines to which of the one or more customer endpoint devices the text message is to be forwarded. For example, the preference of the customer may indicate that text messages are to be forwarded to one or more of the customer's IP phone, cell phone, and/or set-top box. In another example, the customer may have provided another customer's set-top box as the current location for sending the text message. For example, the customer may be visiting a friend and may not have the cell phone available. Hence, the customer may have provided the friend's set-top box (e.g., IP address, account number, etc.) as a current location for receiving text messages.

In one embodiment, the application server 212 also determines if the preference of the customer allows for inputs from the sender. If the preference of the customer allows for inputs from the sender, the application server processes an input (if any) from the sender, and then forwards the text message in accordance with the sender input. If the preference of the customer does not allow for an input from the sender, the application server forwards the text message towards the customer in accordance with only the customer's own preferences.

Figure 3:
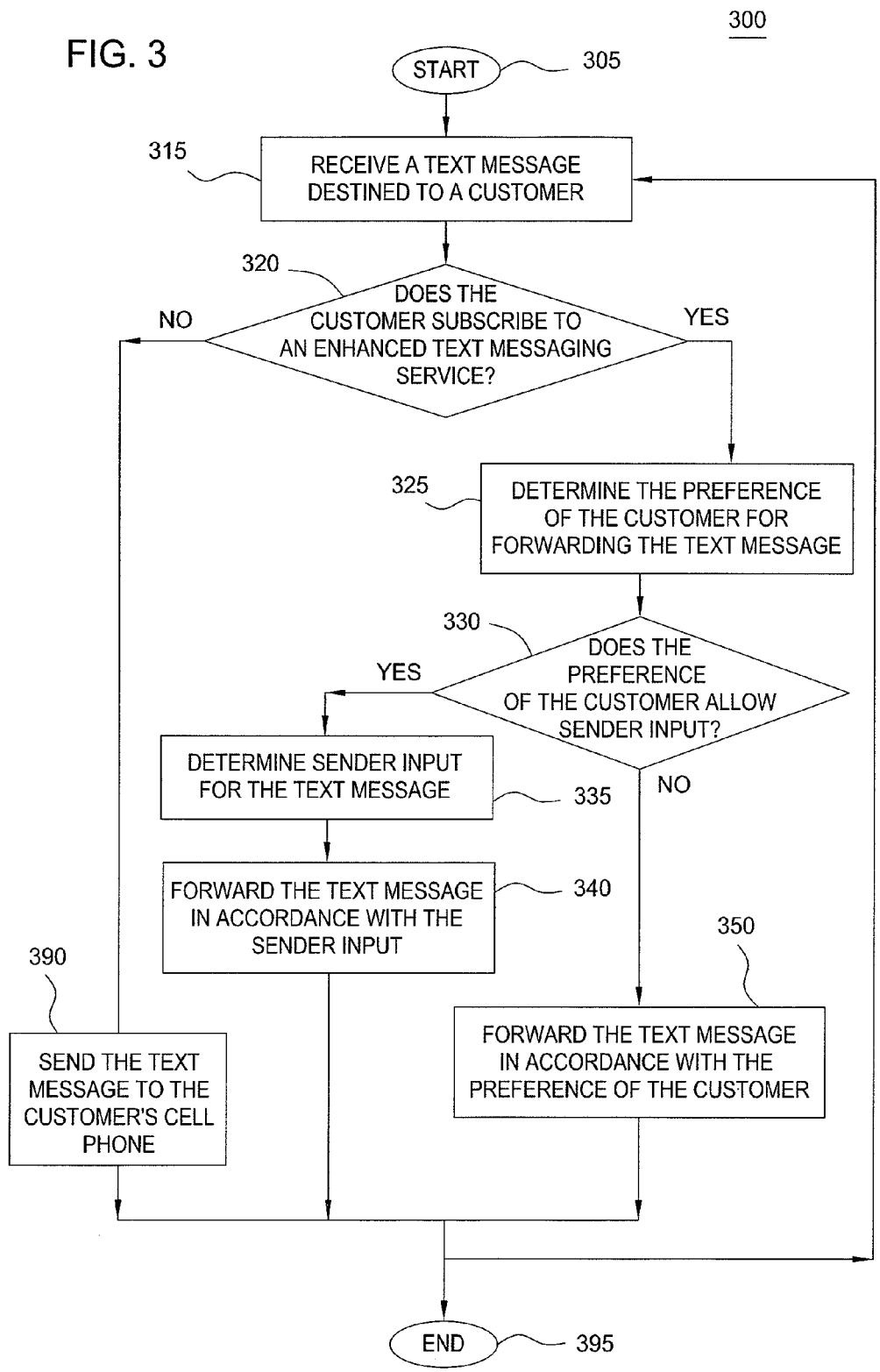
FIG. 3 illustrates a flowchart of a method for providing an enhanced text messaging service.

FIG. 3 illustrates a flowchart of a method 300 for providing an enhanced text messaging service. For example, one or more steps of method 300 can be implemented in an application server, wherein the application server communicates with customer endpoint devices via one or more access networks, e.g., a cellular network, a broadcast cable network, and/or an IP phone service network. Method 300 starts in step 305 and proceeds to step 315.

In step 315, method 300 receives a text message destined to a customer. For example, the application server receives a text message destined to a customer's cell phone.

In step 320, method 300 determines if the customer subscribes to an enhanced text messaging service, wherein the enhanced text messaging service enables the customer to receive text messages via one or more of: an IP phone, a set-top box, and/or a cell phone. If the customer subscribes to an enhanced text messaging service, the method proceeds to step 325. Otherwise, the method proceeds to step 390.

In step 325, method 300 determines the preference of the customer for forwarding the text message. For example, the method determines to which of the customer's one or more customer endpoint devices the customer prefers to have the text message forwarded (and optionally in what order). It should be noted that the term "forwarded" broadly encompasses forwarding a text message serially (e.g., sending the text message to one customer endpoint device first, then to another, and so on) and simultaneously (e.g., sending the received text message to all the specified customer endpoint devices at the same time). For example, if the preference of the customer indicates forwarding text messages from family members to all customer endpoint devices in accordance with the customer profile, and the text message is from a family member, the method identifies and sends the text message to all the customer endpoint devices specified in the customer profile.

In step 330, method 300 optionally determines if the preference of the customer allows sender input. If the preference allows for sender input, the method proceeds to step 335. Otherwise, the method proceeds directly to step 350. For example, the customer may prefer the sender of the text message to provide a priority level for the text message. In turn, the sender may identify the text message as being a high priority or a low priority text message, etc.

In step 335, method 300 optionally determines the sender input for the text message. For example, the sender of the text message may indicate that the text message is a low priority text message and needs to be sent only to the customer's cell phone. For example, a delay in receiving the text message by the customer may be acceptable. In another example, the sender of the text message may not wish to disrupt the customer, e.g., during non-working hours time (e.g., watching TV, etc.) and hence may prefer not to send the text message to the set-top box.

In step 340, method 300 forwards the text message in accordance with the sender input and the customer preference as deduced in step 325. For the above example, the method sends the text message only to the customer's cell phone. It should be noted that if the sender input is in direct conflict with the customer preference, the customer may dictate how to address such conflicts, e.g., the customer preference will override the sender input. The method then proceeds to step 395 to end processing the current text message or returns to step 315 to continue receiving more text messages.

In step 350, method 300 forwards the text message in accordance with the preference of the customer. For example, the customer preference may indicate that the text message is to be forwarded to a set-top box for a specific time period. The method then proceeds to step 395 to end processing the current text message or returns to step 315 to continue receiving more text messages.

In one embodiment, as part of steps 340 and 350, the method may optionally send a message waiting indicator along with the text message, wherein the message waiting indicator indicates that a text message is waiting to be viewed. This message waiting indicator can be displayed first on the customer endpoint device. This will allow the customer a measure of privacy if the customer endpoint device is a shared device, e.g., a television being watched by a plurality of individuals. This will allow a customer to read the text message immediate or ignore the text message if the customer deems that it is not appropriate to view the text message via that particular transmission medium at that particular time.

In step 390, method 300 sends the text message to the customer's cell phone. That is, the application server processes the text message using standard procedure. The method then proceeds to step 395 to end processing the current text message or returns to step 315 to continue receiving more text messages.

It should be noted that although not specifically specified, one or more steps of method 300 may include a storing, displaying and/or outputting step as required for a particular application. In other words, any data, records, fields, and/or intermediate results discussed in the method 300 can be stored, displayed and/or outputted to another device as required for a particular application. Furthermore, steps or blocks in FIG. 3 that recite a determining operation, or involve a decision, do not necessarily require that both branches of the determining operation be practiced. In other words, one of the branches of the determining operation can be deemed as an optional step.

Figure 4:
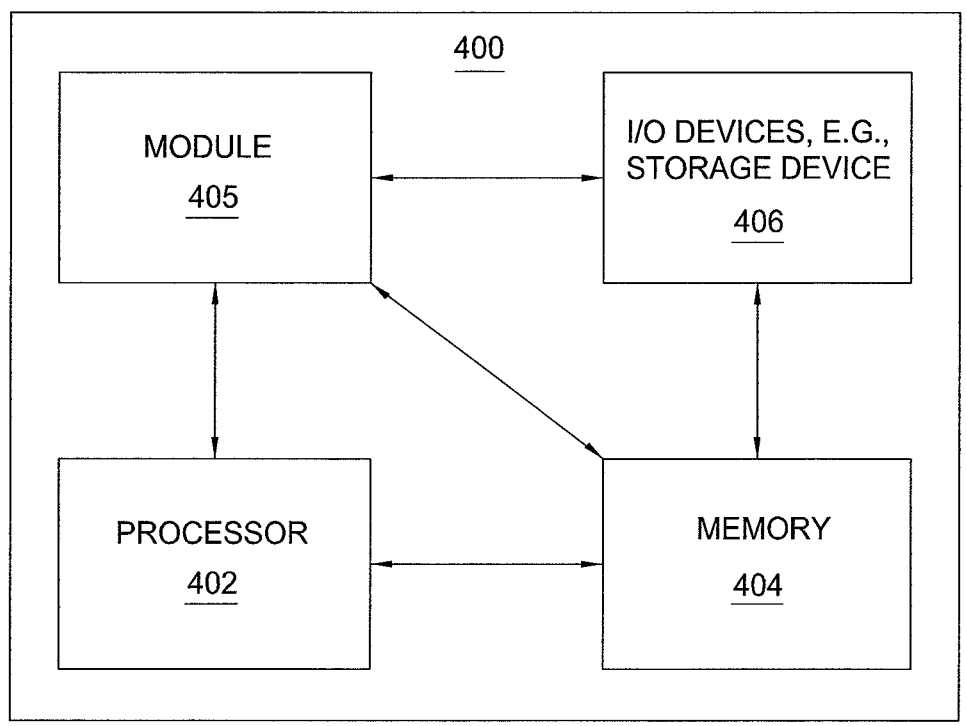
FIG. 4 illustrates a high-level block diagram of a general purpose computer suitable for use in performing the functions described herein.

FIG. 4 depicts a high level block diagram of a general purpose computing device suitable for use in performing the functions described herein. As depicted in FIG. 4, the system 400 comprises a processor element 402 (e.g., a CPU), a memory 404, e.g., random access memory (RAM) and/or read only memory (ROM), a module 405 for providing an enhanced text messaging service, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)). Thus, system 400 may broadly represent a mobile endpoint device or a network element such as a call control element.

It should be noted that the present disclosure can be implemented in software and/or in a combination of software and hardware, e.g., using application specific integrated circuits (ASIC), a general purpose computer or any other hardware equivalents. In one embodiment, the present module or process 405 for providing an enhanced text messaging service can be loaded into memory 404 and executed by processor 402 to implement the functions as discussed above. As such, the present process 405 for providing an enhanced text messaging service (including associated data structures) of the present disclosure can be stored on a computer readable storage medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for providing a text messaging service, comprising:
  receiving, via a processor, a text message destined to a customer;
  determining, via the processor, a preference of the customer to whom the text message is destined for forwarding the text message, wherein the preference comprises a plurality of customer endpoint devices for receiving the text message, wherein the plurality of customer endpoint devices comprises a mobile phone and a set-top box, wherein the preference further comprises a specification of at least one of the plurality of customer endpoint devices to be selected for receiving the text message based on an identity of a sender of the text message and a priority of the text message; and
  forwarding, via the processor, the text message to the customer based on a sender input, when the preference of the customer allows for processing of the text message in accordance with the sender input, wherein the sender input comprises a specification of a particular type of customer endpoint device of the plurality of customer endpoint devices to which the text message is to be forwarded.

2. The method of claim 1, wherein the preference of the customer indicates to which of the plurality of customer endpoint devices the text message is to be forwarded.

3. The method of claim 1, wherein the preference of the customer is received by a service provider via a mobile phone.

4. The method of claim 1, wherein the preference is based on a time of day.

5. The method of claim 1, wherein the preference is based on an order of the plurality of customer endpoint devices in receiving the text message.

6. The method of claim 1, further comprising:
  sending a message waiting indicator along with the text message, wherein the message waiting indicator indicates that a text message is waiting to be viewed.

7. The method of claim 6, wherein the message waiting indicator comprises an identity of a sender.

8. A non-transitory computer-readable storage medium storing a plurality of instructions which, when executed by a processor, cause the processor to perform operations for providing a text messaging service, the operations comprising:
  receiving a text message destined to a customer;
  determining a preference of the customer to whom the text message is destined for forwarding the text message, wherein the preference comprises a plurality of customer endpoint devices for receiving the text message, wherein the plurality of customer endpoint devices comprises a mobile phone and a set-top box, wherein the preference further comprises a specification of at least one of the plurality of customer endpoint devices to be selected for receiving the text message based on an identity of a sender of the text message and a priority of the text message; and forwarding the text message to the customer based on a sender input, when the preference of the customer allows for processing of the text message in accordance with the sender input, wherein the sender input comprises a specification of a particular type of customer endpoint device of the plurality of customer endpoint devices to which the text message is to be forwarded.

9. The non-transitory computer-readable storage medium of claim 8, wherein the preference of the customer indicates to which of the plurality of customer endpoint devices the text message is to be forwarded.

10. The non-transitory computer-readable storage medium of claim 8, wherein the preference of the customer is received by a service provider via a mobile phone.

11. The non-transitory computer-readable storage medium of claim 8, wherein the preference is based on a time of day.

12. The non-transitory computer-readable storage medium of claim 8, wherein the preference is based on an order of the plurality of customer endpoint devices in receiving the text message.

13. The non-transitory computer-readable storage medium of claim 8, further comprising:

sending a message waiting indicator along with the text message, wherein the message waiting indicator indicates that a text message is waiting to be viewed.

14. An apparatus for providing a text messaging service, comprising:

a processor; and a computer readable medium storing a plurality of instructions that, when executed by the processor, cause the processor to perform operations, the operations comprising:

receiving a text message destined to a customer;

determining a preference of the customer to whom the text message is destined for forwarding the text message, wherein the preference comprises a plurality of customer endpoint devices for receiving the text message, wherein the plurality of customer endpoint devices comprises a mobile phone and a set-top box, wherein the preference further comprises a specification of at least one of the plurality of customer endpoint devices to be selected for receiving the text message based on an identity of a sender of the text message and a priority of the text message; and forwarding the text message to the customer based on a sender input, when the preference of the customer allows for processing of the text message in accordance with the sender input, wherein the sender input comprises a specification of a particular type of customer endpoint device of the plurality of customer endpoint devices to which the text message is to be forwarded.

* * * * *